United States Patent [19]

Marez et al.

[11] 4,302,805
[45] Nov. 24, 1981

[54] POWER SUPPLY UTILIZING A HIGH FREQUENCY MAGNETIC AMPLIFIER

[75] Inventors: Alejandro Marez; Jon J. Spykerman, both of Fort Worth, Tex.

[73] Assignee: Kyber Engineering, Inc., Fort Worth, Tex.

[21] Appl. No.: 124,925

[22] Filed: Feb. 26, 1980

Related U.S. Application Data

[63] Continuation of Ser. No. 864,771, Dec. 27, 1977, abandoned.

[51] Int. Cl.³ .................................................. H02P 13/24
[52] U.S. Cl. ........................................ 363/91; 323/214; 323/253; 323/259; 363/101
[58] Field of Search ...................... 323/214, 249–251, 323/253, 259, 261, 262; 363/86, 90, 91, 93, 101

[56] References Cited

U.S. PATENT DOCUMENTS

| | | |
|---|---|---|
| 1,227,302 | 5/1917 | Osnos . |
| 2,516,563 | 7/1950 | Graves . |
| 2,802,185 | 8/1957 | Dewitz . |
| 2,802,186 | 8/1957 | Dewitz . |
| 2,970,224 | 1/1971 | Lipkin et al. . |
| 3,042,848 | 7/1962 | Muchnick et al. . |
| 3,271,690 | 9/1966 | Cockrell . |
| 3,343,074 | 9/1967 | Brock . |
| 3,408,554 | 10/1968 | Fingerett . |
| 3,452,268 | 6/1969 | Grossoehme . |
| 4,005,352 | 1/1977 | Kugler et al. . |

*Primary Examiner*—William M. Shoop
*Attorney, Agent, or Firm*—Richards, Harris & Medlock

[57] ABSTRACT

A regulated power supply includes an oscillating inverter circuit for generating a high frequency square wave signal that drives a saturable reactor which pulse-width modulates the square wave as a function of a control current through a control winding on the saturable reactor. The output voltage generated by the power supply in sensed by a feedback circuit and fed back as a modulating signal of the control current through the saturable reactor control winding to vary the power transferred by the saturable reactor to an output transformer. The variation in power supplied to the output transformer compensates the output voltage as sensed by the feedback circuit. A protective circuit is provided to sense an output overvoltage condition and inactivate the power supply by terminating the oscillation of the inverter.

19 Claims, 9 Drawing Figures

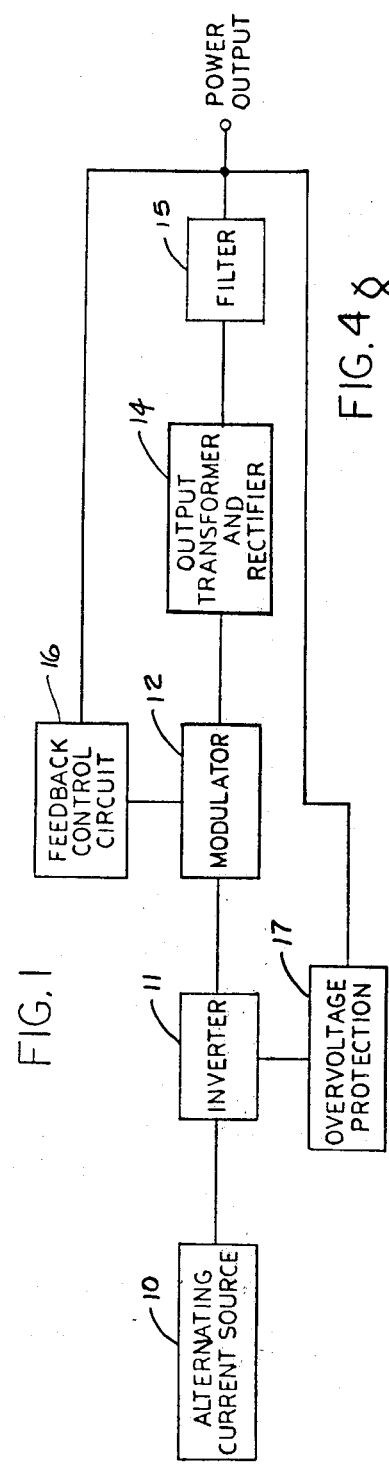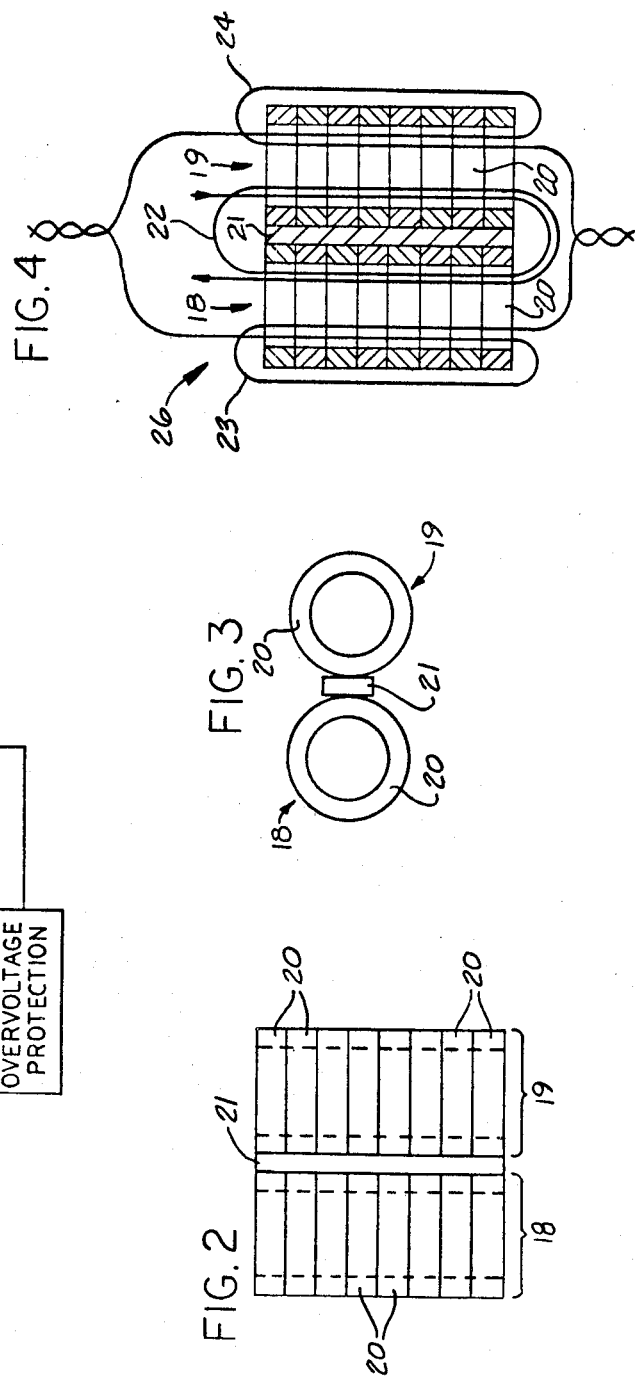

FIG.5b

POWER SUPPLY UTILIZING A HIGH FREQUENCY MAGNETIC AMPLIFIER

This is a continuation of application Ser. No. 864,771, filed Dec. 27, 1977, and now abandoned.

BACKGROUND OF THE INVENTION

The present invention relates to electrical power supplies and more particularly to a saturable reactor power transformation and regulation system.

Power supplies for electronic devices are divided into generally two types. In one type of conventional linear power supply, the input alternating current is transformed to the appropriate voltage, rectified, and filtered by an assortment of capacitors and inductors. A linear regulator is then provided in the output circuit to maintain a constant output voltage. Although this design is widely used, it requires the use of heavy transformers and capacitors and has a relatively low power transform efficiency.

In a second type of conventional power supply, the incoming alternating power signal is rectified and filtered and supplied to an inverter circuit. The inverter switches the filtered signal on and off at a high rate to generate a high frequency square wave. An output transformer then converts the square wave to the desired voltage level and the resulting signal is passed through a rectifying network and filters to produce a DC output. The output of the power supply is regulated by varying the pulse width of the signal generated by the inverter. Although this design uses lighter components and has a relatively high transform efficiency, it produces substantial noise in the output. This level of noise is often unacceptable in the operation of computers and other transistor switching circuits.

In accordance with the present invention, there is provided a power supply which is not only lightweight and efficient but also generates a low noise output with a closely regulated voltage level.

SUMMARY OF THE INVENTION

A DC power supply in accordance with the present invention utilizes a high frequency saturable reactor wherein parallel stacks of ferrite toroids are separated by a nonmagnetic plate. A control winding passes through the centers of both stacks and a pair of gate windings are connected in series, with each winding passing through the center of one stack. The saturable reactor is driven by an oscillating inverter which is initiated by a starting circuit. Upon activation of the power supply, a transistor is forward biased to turn on a first of a pair of oscillating transistors. A capacitor is charged by the oscillator output to reverse bias the transistor after oscillation is begun.

The power supply has an overvoltage protection circuit wherein a zener diode detects an overvoltage condition and activates a silicon controlled rectifier to ground the secondary winding of a transformer in the inverter and terminates oscillation of the inverter.

For regulation of the output voltage, a feedback circuit is provided to vary the current through the control winding of the saturable reactor in order to pulse modulate the signal applied to the output power transformer and thereby compensate the output voltage.

An inverter circuit for the power supply comprises a full wave rectifier, capacitance energy storage, and two pairs of synchronously oscillating switching transistors which generate a high frequency square wave coupled to the saturable reactor.

Switching diodes are disposed in the secondary windings of the output power transformer to rectify the square wave input to the primary winding. A saturable toroid is provided in the gate winding of the saturable rector to block high frequency reverse voltages generated during the transition of the switching diodes.

BRIEF DESCRIPTION OF THE DRAWINGS

For a more complate understanding of the present invention and the advantages thereof, reference is now made to the following description taken in conjunction with the accompanying drawings in which:

FIG. 1 is a block diagram of a power supply in accordance with the present invention, FIG. 2 is an elevation view of the core elements of a saturable reactor, FIG. 3 is a plan view of the saturable reactor shown in FIG. 2, FIG. 4 is a cross sectional view of a modulator in accordance with the present invention, FIGS. 5a and 5b are a schematic diagram of a power supply in accordance with the present invention.

DETAILED DESCRIPTION OF THE INVENTION

Figure 5A:
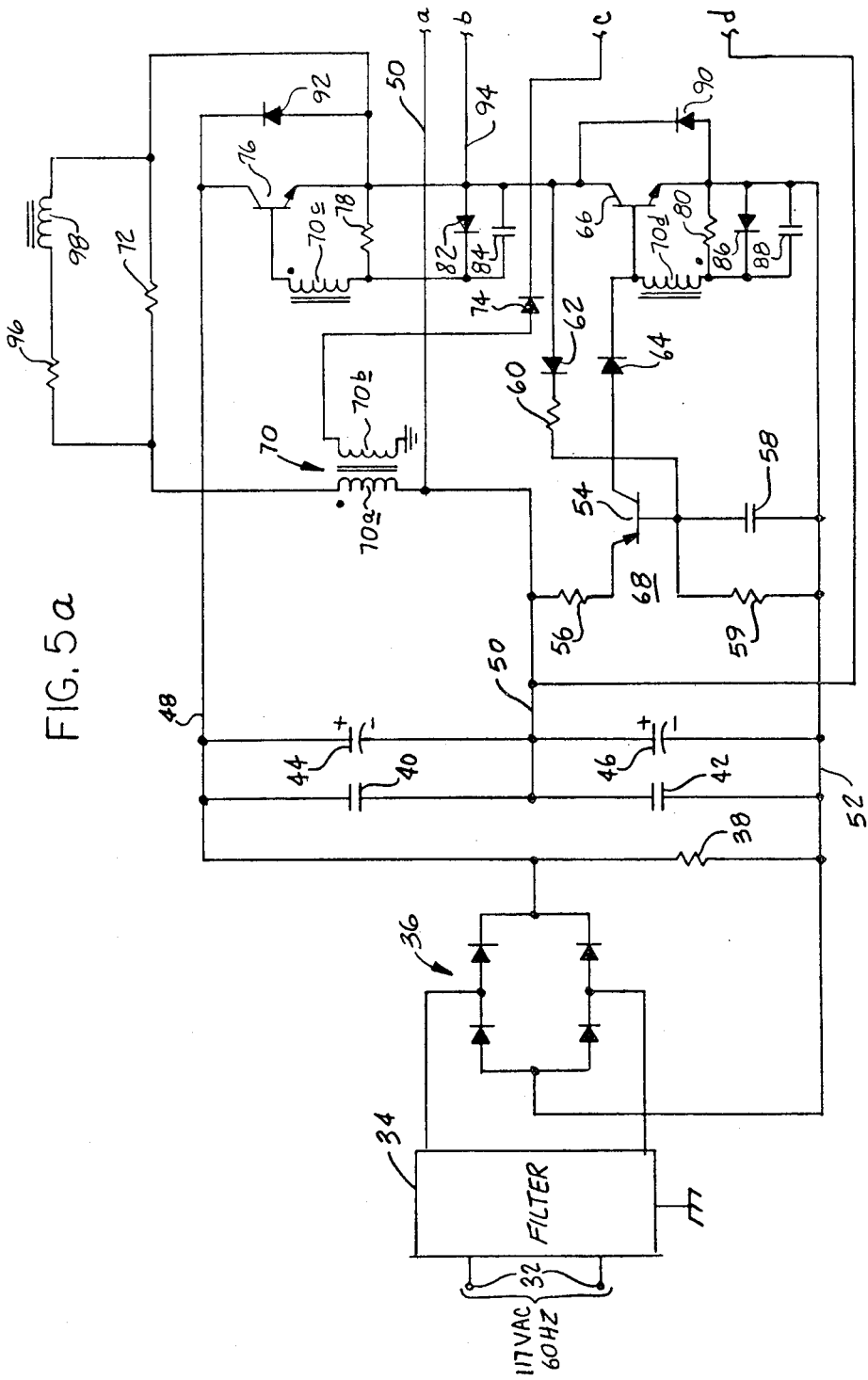

FIG. 1 illustrates a power supply in accordance with the present invention. A conventional alternating current source 10 provides power to an inverter 11 which generates a higher frequency square wave output signal. This output signal is provided to the control winding of a modulator 12 which regulates the power level of a voltage applied to an output transformer and rectifier 14 by pulse-width modulating the square wave signal input to the modulator. The output transformer 14 is selected to provide the desired output voltage of the power supply through a filter 15. A constant output voltage level is maintained by a feedback control circuit 16 that generates a control current to the modulator 12. The amplitude of the control current is proportional to the power transferred from the inverter 11 to the output transformer 14 which in turn determines the voltage provided at the output of the filter 15. The output voltage is also monitored by an over-voltage protection circuit 17 that generates a signal to disable the inverter 11 when the output voltage exceeds a predetermined level. Thus, there is provided a power supply which provides a regulated output, compensates for source and load power variation, and protects the load from application of an excessive voltage.

Referring to FIGS. 2, 3 and 4, the modulator 12 includes a high frequency saturable reactor that includes parallel stacks 18 and 19 of individual ferrite toroids 20. A nonmagnetic material 12 is disposed between the stacks 18 and 19 to separate the flux paths of the two stacks of toroids. The saturable reactor core is shown in a plan view in FIG. 3. The ferrite toroids 20 in each stack are positioned such that their centers are coaxial.

A modulator 26 including the saturable reactor core illustrated in FIGS. 2 and 3 is shown in an elevational cross section view in FIG. 4. The modulator has a control winding 22 and a series pair of gate windings 23 and 24. The control winding 22 passes through the centers of both stacks 18 and 19 and therefore encircles segments of each of the ferrite toroids 20. Gate winding 23 encircles only the ferrite toroids 20 comprising stack 18 while gate winding 24 encircles only the ferrite toroids 20 comprising stack 19. Windings 23 and 24 are wound such that the flux induced by these coils in the toroids passes in opposite directions through the control winding 22.

Referring now to FIG. 4, in operation, a direct current is supplied to the control winding 22 to establish a flux field within the toroids. A square wave signal is applied to the gate windings 23 and 24 and these coils generate magnetic flux which adds to that flux already established in the toroids by the control winding 22. After a short period of time, the added flux created by windings 23 and 24 causes the flux density within the toroids to reach the saturation point. Before saturation, the windings exhibit a very high impedance level, but after flux saturation is reached in the toroids, the gate windings exhibit a very low impedance, which is essentially only the resistance of the wire. The period of time required to drive the toroids into saturation can be varied by adjusting the current carried by the control winding 22. Therefore, the impedance presented by the gate windings 23 and 24 of modulator 26 is controlled by the current in the control winding 22.

Figure 5B:
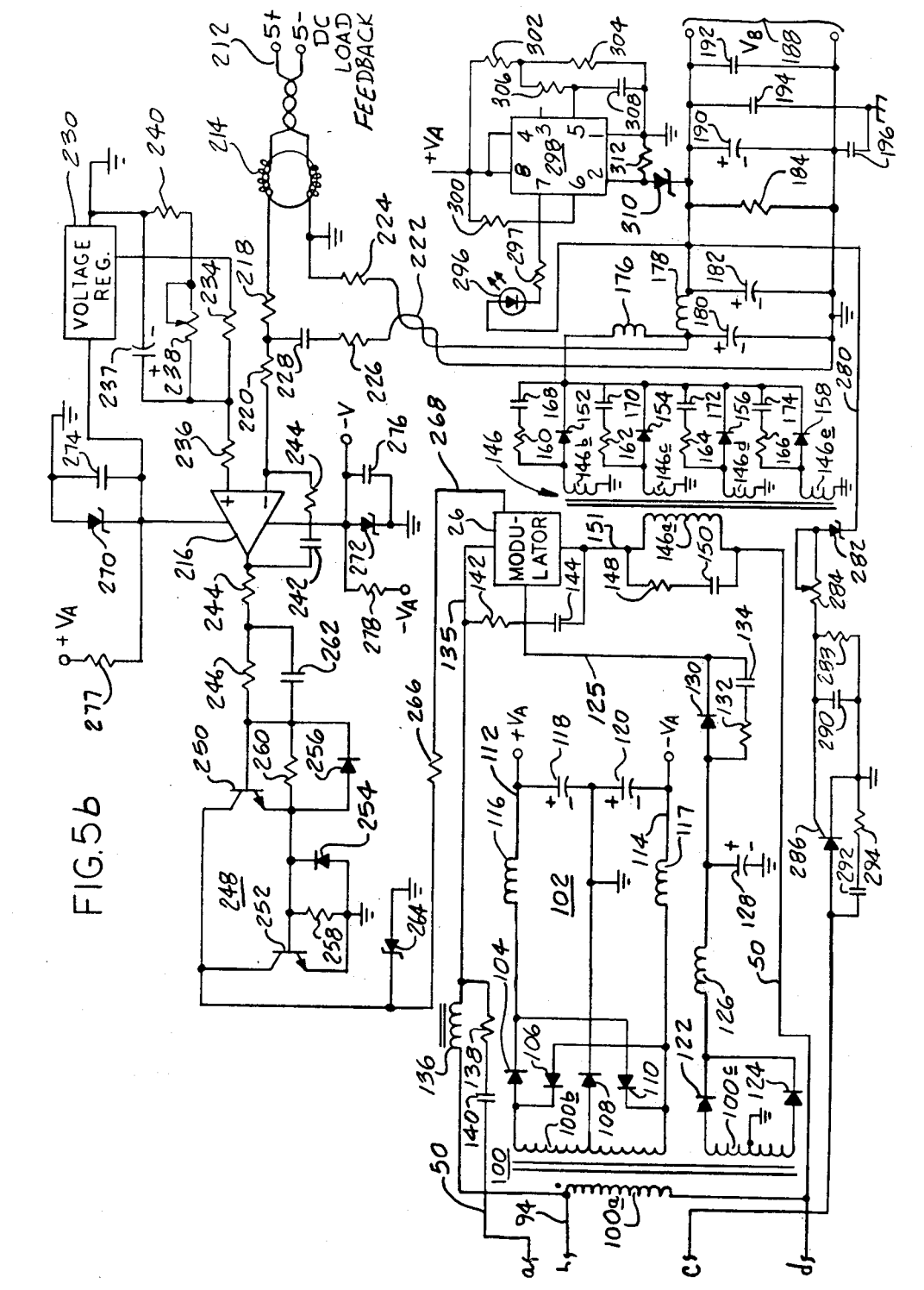

Referring to FIGS. 5a and 5b, there is shown a schematic of the power supply of FIG. 1 utilizing the modulator 26 of FIG. 4. An alternating current power source is connected to the input lines 32 through a radio frequency interference (RFI) filter 34 to a full-wave rectifier 36. A resistor 38 is disposed across the output lines of the full wave rectifier 36 and is in parallel with a series combination of filter capacitors 40 and 42. Energy storage capacitors 44 and 46 are disposed in parallel with capacitors 40 and 42 respectively. With a 117 volt alternating current 60 hertz power source, there is produced on line 48 a positive 45 volt DC signal with respect to line 50 and a minus 85 volt DC signal on line 52 also with respect to line 50.

The emitter of a transistor 54 is connected to line 50 through a load resistor 56, and the base of transistor 54 is connected by a capacitor 58 to line 52. Resistor 59 is in parallel with capacitor 58. A resistor 60 is connected between the base of transistor 54 and the cathode of a diode 62. The collector of transistor 54 is connected through a diode 64 to the base of a transistor 66. The transistor 54 and its adjacent circuit element comprise a starting circuit 68.

A transformer 70 has a primary winding 70a which is connected between line 50 and a resistor 72. A secondary winding 70b of transformer 70 is connected between ground and a diode 74. Secondary 70c of transformer 70 is connected between the base of a transistor 76 and a resistor 78 and a secondary winding 70d Is joined between the base of the transistor 66 and a resistor 80.

A blocking diode 82 and a capacitor 84 are connected in parallel with the resister 78. Another blocking diode 86 and a capacitor 88 are connected in parallel with the resistor 80. Protection diodes 90 and 92 are connected between the collectors and emitters of transistors 66 and 76 respectively.

Transistors 66 and 76 together with the associated circuitry function as an inverter to produce a high frequency square wave signal on line 94, which joins the emitter of transistor 76 to the collector of transistor 66. The output signal on line 94 is produced by the transistors 66 and 76 being alternately turned on and off. Oscillation of the inverter circuitry is initiated by the starting circuit 68.

When power is initially applied to terminals 32 the transistors 54, 66, and 76 will be off. Since the capacitor 58 is initially discharged, the base of transistor 54 will be at a minus 85 volt potential and the emitter will be at a higher potential due to the resistor 56. Since the emitter is at a higher potential than the base, transistor 54 will be forward biased therefore also forward biasing diode 64. A voltage at the cathode of the diode 64 is then applied as a potential to the base of transistor 66, and this voltage is higher than the potential at the emitter. This higher potential applied to the base of transistor 66 relative to the emitter, which is connected to line 52, forward biases transistor 66. Capacitor 58 now rapidly charges through diode 62 and resistor 60 after the power is applied and transistors 66 and 76 start to oscillate. As it charges, capacitor 58 reverse biases transistor 54 thereby turning it off and opening the connection between line 50 and the base of transistor 66.

When transistor 66 is forward biased its collector electrode is effectively connected to line 52 thereby applying a minus 85 volt potential to the primary 70a of the transformer 70. The resulting current flow through this primary winding induces voltages in secondary windings 70c and 70d which tend to enhance the forward bias on transistor 66 and apply a reverse bias to transistor 76 thereby holding it in an off state. When transformer 70 has saturated, the induced voltages in the secondary windings 70c and 70d drop to zero thereby causing transistor 66 to be switched off. This opens the circuit passing from line 50 through primary 70a to line 52. Opening this circuit causes the field in transformer 70 to collapse which in turn produces reverse voltages in secondary windings 70c and 70d. The voltage now induced in secondary winding 70c will forward bias transistor 76 thereby turning it on while the voltage induced in secondary winding 70d will tend to hold transistor 66 turned off by means of reverse bias voltage.

With transistor 76 forward biased, line 48 is connected to the primary winding 70a of the transformer 70. The current flow through the primary winding 70a induces a voltage in secondary winding 70c to further forward bias this transistor and hold it on. A voltage is also induced in the secondary winding 70d to reverse bias transistor 66 and turn it off. When transformer 70 has saturated, the biasing voltage on transistor 76 will be removed and transistor 76 will open. This opens the circuit of the primary winding 70a and causes the field to collapse thereby inducing opposite polarity voltages in secondary windings 70c and 70d. These induced voltages will cause transistor 66 to be biased on and transistor 76 to be biased off. This process is repeated as long as power is supplied thereby generating a square wave signal on line 94. In one embodiment of the invention the square wave signal has a frequency of 30 kilohertz.

Blocking diodes 82 and 86 are provided to prevent improper biasing of transistors 76 and 66 respectively. Capacitors 84 and 88 provide a means for suppressing the transient voltages created when the fields in the secondary windings 70c and 70d collapse.

The series combination of resistor 96 and inductor 98 are in parallel with the resistor 72. Resistor 96 is selected to be of a value smaller than resistor 72. For any voltage transistions on line 94 the inductor 98 initially presents a very high impedance thereby making the effective impedance in the line 94 that of resistor 72. However, as soon as inductor 98 saturates, it in effect becomes a short circuit and the impedance in the line 94 becomes the parallel combination of resistors 96 and 72, a smaller value than that of resistor 72 alone. Inductor 98 is selected to be of an inductance that will cause saturation prior to the saturation of primary winding 70a of transformer 70. The function of inductor 98 and resistor 96 is to produce a sharp transition from the positive and negative extremes of the square wave on line 94. The low impedance at the end of the cycle increases the current flow so as to maintain the peak voltage until the transition occurs. This prevents the trailing transition from becoming rounded, thereby reducing the power transferred from the inverter.

Referring to FIG. 5b, the square wave signal on line 94 is supplied to a transformer 100 having a primary winding 100a and secondary windings 100b and 100c. Transformer 100 drives an auxillary power supply circuit 102 which produces supply voltages for driving other circuits within the power supply. Secondary winding 100b drives bridge rectifiers 104, 106, 108, and 110 to produce a positive voltage ($+V_A$) on line 112 and a negative voltage ($-V_A$) on line 114. Inductors 116 and 117 and capacitors 118 and 120 are provided to filter the supply voltages. In one embodiment of the invention the $V_A$ voltages are plus and minus 25 volts respectively.

Also included in the auxiliary power supply 102 is the center tap secondary 100c which drives diodes 122 and 124 to produce a DC voltage to a first control terminal, on line 125, of the modulator 26. Inductor 126 and capacitor 128 provided filtering for the signal thus produced. Diode 130 is disposed in series between the inductor 126 and the first control terminal of modulator 26. A series combination of a resistor 132 and a capacitor 134 are in parallel with the diode 130 and provide a means for suppressing diode damaging voltage transients.

Line 94 is also connected to the first gate terminal of modulator 26 through an inductor 136 in a line 135. Also connected to the line 135 is a series combination of a resistor 138 and a capacitor 140, the later tied to the line 50.

A resistor 142 and a capacitor 144 are in a series combination between the first and second gate terminals of modulator 26. Also connected to the second terminal of the modulator 26 is a transformer 146 having a primary winding 146a connected in parallel with a series combination of a resistor 148 and a capacitor 150. Joined to the second terminal of the primary winding 146a is the second terminal of primary winding 100a of transformer 100.

Transformer 146 has secondary windings 146b, 146c, 146d, and 146e having respectively disposed in series therewith diodes 152, 154, 156, and 158. To suppress voltage spikes the diodes 152, 154, 156, and 158 are connected in parallel with resistors 160, 162, 164, and 164 together with capacitors 168, 170, 172, and 174 respectively. A filter inductor 176 is tied to a common interconnection of the diodes 152, 154, 156 and 158. An additional filter inductor 178 is in series with the filter inductor 176 and forms a T-filter network with capacitors 180 and 182. As a part of an output circuit, a load resistor 184 is connected in parallel with energy storage capacitors 190 and 192. Also forming a part of the output circuit are capacitors 194 and 196 interconnected between the positive terminal of output terminals 188 and ground.

Figure 6:
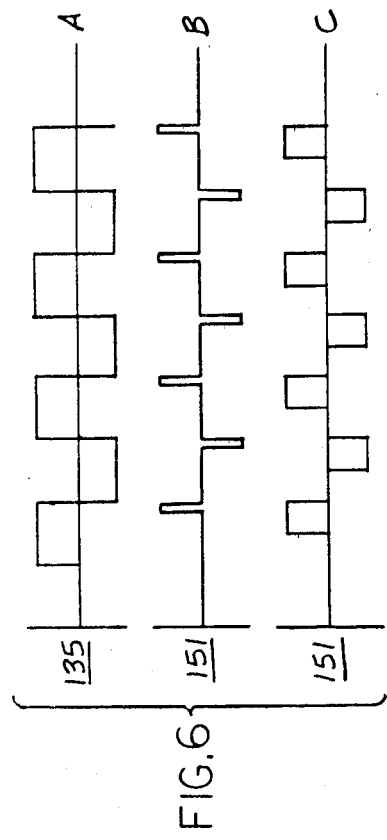
FIG. 6 is a set of waveforms representing signals generated in the embodiment shown in FIGS. 5a and 5b.

In operation, the square wave signal on line 94 is applied to the first gate terminal, line 135, of modulator 26 which has the second gate terminal, line 151, connected through the primary winding of transformer 146 to line 52. Modulator 26, which was described with reference to FIG. 4, functions to pulse-width modulate the square wave signal on line 135. The output of the modulator on line 151 is supplied to the primary winding of transformer 146. Waveforms of the signals present on lines 135 and 151 are shown in FIG. 6. Control signals applied to the modulator 26 provide the pulse-width modulation.

Referring to FIG. 6, waveform A illustrates the square wave signal generated on line 135 by the inverter circuit. The modulated output of modulator 26 on line 151 is shown at a low modulation level in waveform B and at a higher modulation level in waveform C.

The output of the modulator 26 on line 151 is coupled to the primary winding 146a of the transformer 146. Positive-going current pulses on line 151 induce pulse voltage in secondary windings 146b and 146c which are passed through diodes 152 and 154 to the immediately following filter and storage elements. Negative-going pulses are transferred to secondary windings 146d and 146e and passed through diodes 156 and 158. Filter elements 176, 178, 180, 182, 190, 192, 194, and 196 are provided to suppress voltage transients and to smooth the output voltage.

The output of the power supply, $V_B$, at the output terminals 188, can be used to power a device at a remote location. Conventional loads, which are powered in this manner, include computers and other types of transistor switching devices together with their peripheral equipment. In order to maintain a constant voltage level at the user device, the present invention provides a feedback regulation network. A DC load feedback cable 212 is provided to feed back the voltage supplied to the user device located remote from the power supply. Cable 212 is connected through an RFI filter 214 to remove any transient voltages generated by either the user device or induced into the load feedback cable 212 by other local electrical equipment. The feedback output voltage is provided to the inverting input of an operational amplifier 216 through a series combination of mixing resistors 218 and 220.

Ripple voltages generated by the power supply are monitored over a cable 222. These ripple voltages are mixed with the feedback load voltage at the junction of mixing resistors 218 and 220. The grounded lead of the cable 222 is connected through a resistor 224 to the ground terminal of the cable 212. The second lead of cable 222 is connected through the series combination of a resistor 226 and a capacitor 228 to the interconnection of resistors 218 and 220 to eliminate DC voltages.

A reference input is applied to the noninverting input of the operational amplifier 216. This reference voltage is supplied by a voltage regulator 230 which is powered by the positive voltage, $+V_A$, that is generated by the auxiliary power supply 102, previously described. The output of the voltage regulator 230 is passed through the series combination of voltage divider resistors 234 and 236. A capacitor 237 is connected between the junction of resistors 234 and 236 and circuit ground. A potentiometer 238 is disposed between the junction of the resistors 234 and 236 and in series with a resistor 240 which is connected to ground. The potentiometer 238 is adjusted to set the output voltage, $V_B$, generated by the power supply at the output terminals 188. This potentiometer sets the reference voltage which is supplied to the noninverting input of the operational amplifier 216. Negative feedback is provided to the operational amplifier 216 by the series combination of a capacitor 242 and a resistor 244.

A control signal is generated by the operational amplifier 216 and is passed through a series combination of resistors 244 and 246 to a Darlington amplifier 248. The Darlington amplifier includes transistors 250 and 252 together with diodes 254 and 256, resistors 258 and 260 and a capacitor 262. A zener diode 264 is connected between the collector of transistor 252 and ground to attenuate voltage transients. The collector of transistor 252 is connected through a current limiting resistor 266 to a control terminal, line 268, of the modulator 26. The Darlington circuit 248 acts as a current sink for the control winding 22 of the modulator 26 and is driven by the control signal output of the operational amplifier 216. The second terminal of the control winding 22 is provided with a constant voltage by the auxiliary power supply 102 on the line 125. This voltage is passed through the control winding of the modulator 26 to the line 268 through the current limiting resistor 266 and to the collector of transistor 252. Thus, the drive voltage applied to the Darlington amplifier 248 determines the amplitude of the current which is passed through the control winding 22 of the modulator 26.

Operational amplifier 216 is powered by the auxiliary power supply 102 which supplies positive voltage $(+V_A)$ and negative voltage $(-V_A)$ to voltage control circuits including zener diodes 270 and 272. Zener diodes 270 and 272 together with the respective filter capacitors 274 and 276 provide the desired plus and minus 15 volt drive for the operational amplifier 216. The resistors 277 and 278 act as voltage dividers between the $V_A$ voltages and the voltage drives to the operational amplifier 216.

In operation, the feedback circuit monitors both the DC voltage level at the user load and the AC ripple on the output voltage of the power supply. Variations in these levels away from the desired reference cause a control signal to be generated by the operational amplifier 216. This control signal drives the Darlington amplifier 248 which increases or decreases the current passing through the control winding 22 of the modulator 26. As the control current varies, the pulse width modulation of the power signal is proportionately varied which in turn controls the current that is transferred from the gate windings 23 and 24 of the modulator 26 to the primary winding of the transformer 146. An increase in current to the transformer from the modulator increases the power supply output voltage while a decrease reduces the output voltage. Thus, a closed loop feedback system is provided wherein the output voltage is maintained at a constant level by regulating the current through the control winding of the modulator 26.

A further feature of the present invention is an overvoltage protection circuit which deactivates the power supply when the output voltage exceeds a predetermined threshold. This feature is provided to prevent damaging the load connected to the power supply. The output voltage is monitored on line 280 which is connected through a zener diode 282 to a potentiometer 284. The potentiometer 284 is connected in series with the gate terminal of a silicon controlled rectifier (SCR) 286. Disposed in parallel between the gate terminal of SCR 286 and ground are a resistor 288 and a capacitor 290. Between the anode of SCR 286 and ground there is connected in series a capaciter 292 and a resistor 294.

The level at which the overvoltage circuit is activated is determined by the potentiometer 284 which acts as a voltage divider in series with the resistor 288. The zener diode 282 provides a stable reference for setting the overvoltage limit.

The anode of SCR 286 is connected to secondary winding 70b of transformer 70 such that when the SCR is conducting, the secondary winding 70b is grounded thereby short circuiting the primary winding 70a and disabling the transformer 70. Since the transformer 70 drives the transistors 66 and 76 that generate the high frequency square wave provided to the modulator 26, the grounding of the secondary winding 70b terminates the oscillations and removes the power which is applied to the modulator. Activation of the SCR 286 occurs when the output voltage $V_B$ exceeds the predetermined threshold set by the potentiometer 284 and triggers the SCR through its gate terminal. After the SCR 286 has been triggered it remains conducting only for the short period that is required to discharge the field in the transformer 70. When the field in the transformer is discharged, the SCR is turned off and the excessive output voltage is no longer present. Capacitor 290 is provided to bypass overvoltage transients which would unnecessarily deactivate the power supply.

After SCR 286 has turned off transistors 66 and 76, capacitor 58, which was charged to a positive 85 volts relative to line 50, is discharged through resistor 59. When the voltage on the base of transistor 54 drops below that of line 50, the transistor 54 is forward biased and restarts the oscillations in transistors 66 and 76 as previously described.

An overvoltage indicator is also provided in the present invention. This indicator is activated to show that the output voltage is in excess of that which is desired but is still less than the threshold required to trip the overvoltage protection circuit. Such operation provides an early warning of a possible failure and indicates a marginal operating condition. An overvoltage indicator light emitting diode 296 is driven by an integrated circuit 298. In one embodiment the integrated circuit 298 is a model NE555 manufactured by National Semiconductor. The indicator 196 is connected between the positive terminal of the output voltage $V_B$ and a sink terminal, pin 7, of the integrated circuit. The power to the integrated circuit is provided by the auxiliary power supply 102 which generates positive voltage $(+V_A)$ to the input on terminals 4 and 8 of the integrated circuit. An external resistor 300 is connected between the voltage supply and terminal 6 of the integrated circuit. Further voltage divider resistors 302, 304, and 306 are connected between the voltage source and terminals 5 and 1. An external capacitor 308 is connected between terminals 5 and 1 of the integrated circuit 298.

The integrated circuit is triggered through terminal 2 which senses the voltage generated at the output terminals 188. A zener diode is connected between terminal 2 and the positive terminal of the output 188. A resistor 312 is connected between terminal 2 and ground. Selection of the level at which the indicator is activated is determined by the zener diode 310. When an excessive voltage is generated which reverse biases zener diode 310, a current sink is applied to terminal 7 which activates light emitting diode 296 through the resistor 297.

Figure 7:
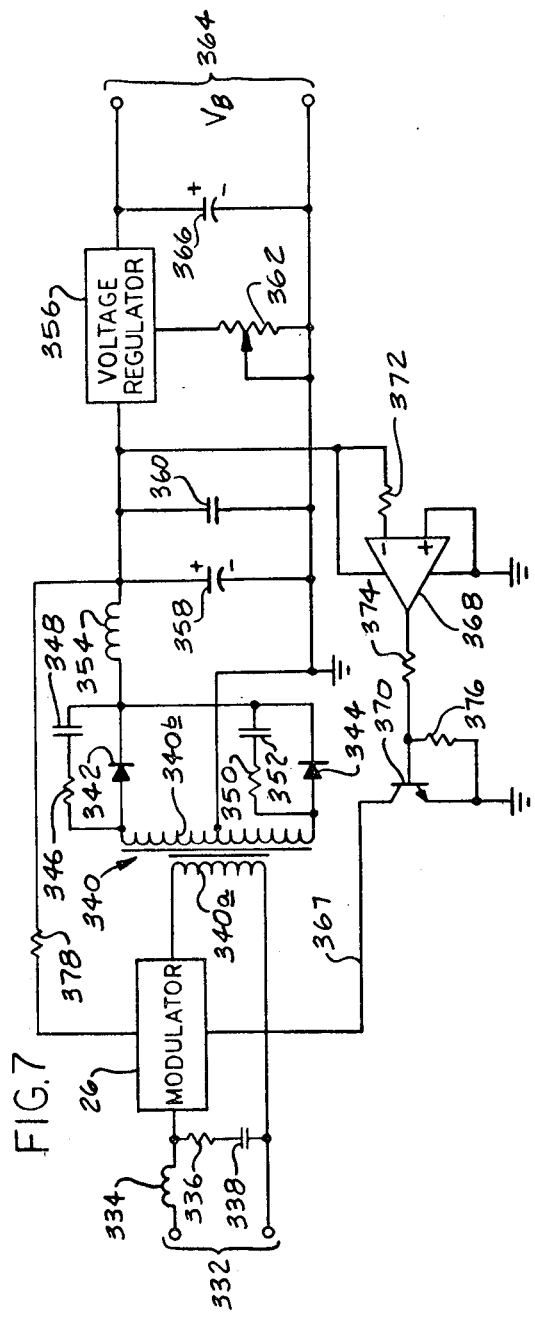
FIG. 7 is a schematic diagram of a power supply representing another embodiment of the present invention.

Another embodiment of the present invention is the power supply shown in FIG. 7. An inverter is connected to terminals 332 and a square wave is passed through a high frequency filter comprising an inductor 334 and a series combination of a resistor 336 and a capacitor 338. The square wave signal is provided to the gate windings 23 and 24 of the modulator 26 previously described. The output of the modulator 26 is passed through the primary winding 340a of a transformer 340 which has a secondary winding 340b. A grounded center tap is provided in the secondary winding 340b.

Terminals of the secondary winding 340b are connected to diodes 342 and 344 which are joined at their cathodes. Each of the diodes has a series high frequency bypass circuit comprising a resistor and capacitor in parallel with the diode. These are resistor 346 in series with a capacitor 348 and resistor 350 in series with a capacitor 352. A series inductor 354 is disposed between the output of the diodes and the input of a voltage regulator 356. Storage capacitor 358 and filter capacitor 360 are connected to the input to the voltage regulator 356. A potentiometer 362 is connected in the ground line of the voltage regulator 356 to adjust the regulated voltage.

The output of the voltage regulator is provided to terminals 364 which supply an output voltage $V_B$ to the user device. A further storage capacitor 366 is provided across the output terminals.

A feedback circuit comprising an operational amplifier 368 driving a transistor 370 is disposed between the input to the voltage regulator 356 and a first terminal, line 367, of the control winding 22 of modulator 26. The inverting input of the operational amplifier 368 is connected through a resistor 372 to the input of the voltage regulator 356. The noninverting input of the operational amplifier 368 is grounded. Operational amplifier 368 drives the base of the transistor 370 through a resistor 374. Bias resistor 376 is disposed between the base of transistor 370 and ground.

The control current for the modulator 26 is provided through a resistor 378 from the input terminal to the voltage regulator 356. Transistor 370 acts as a current sink to regulate the magnitude of the current passing through the control winding 22 of the modulator 26.

The primary function of modulator 26 is to regulate the voltage supplied to the input of the voltage regulator 356. This is accomplished by the feedback circuit wherein the operational amplifier 368 is referenced to ground. When the desired voltage is present on the input line to the voltage regulator 356, the output of the operational amplifier 368 drives transistor 370 such that the desired current is passed through the control winding 22 of modulator 26 to produce the appropriate power transfer to transformer 340. When the voltage at the input of the voltage regulator 356 drops below the desired level, the operational amplifier 368 increases the drive on the transistor 370 so as to increase the current flow through the control winding of the modulator 26. This increases the current supplied to the transformer 340 and raises the voltage present at the input to the voltage regulator 356. If the voltage at the input of the voltage regulator increases, the current through the modulator control winding is decreased and the power transferred to the transformer is reduced thereby reducing the voltage to the input of the voltage regulator.

A conventional power supply design comprises the circuit shown in FIG. 7 minus the modulator 26 and the feedback control circuit. With the conventional supply the voltage regulation is entirely controlled by the voltage regulator 356. This device maintains a constant output voltage from the power supply by varying the voltage drop across the regulator itself. The minimum voltage drop across the regulator is two volts, but when an increased voltage is applied to the input terminal, the regulator must have a proportionately increased voltage drop across it. The increased voltage drop across the regulator severely reduces the overall power transform efficiency of the power supply. With the addition of the modulator 26 and the feedback circuitry, the input voltage is maintained at essentially a constant level so as to keep the overall power supply operating as its maximum efficiency level.

Figure 8:
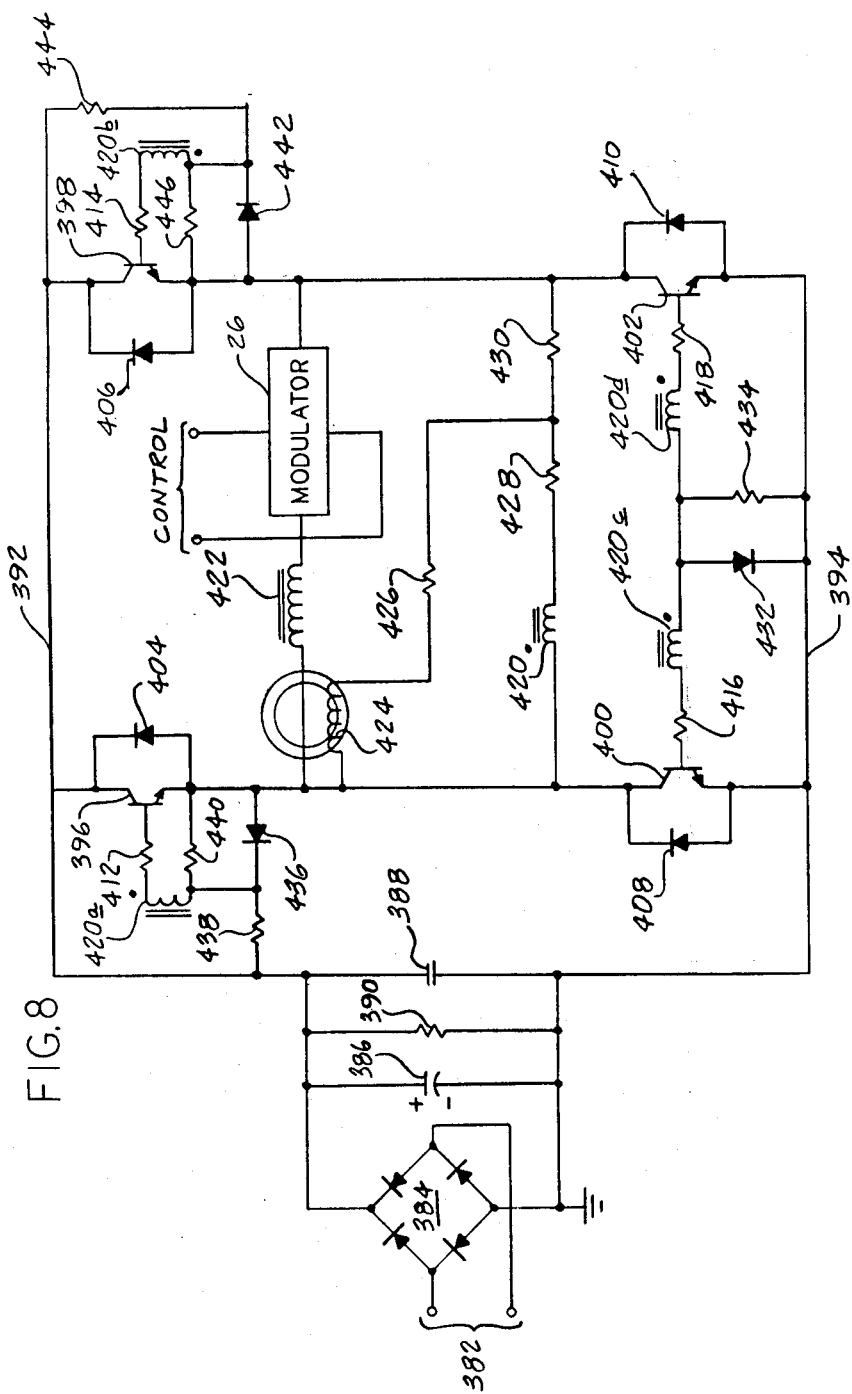
FIG. 8 is schematic diagram of a full bridge inverter.

Still another embodiment of the present invention is the full bridge inverter illustrated schematically in FIG. 8. In the embodiment shown in FIGS. 5a and 5b, the inverter generated a square wave signal with positive and negative 85 volt levels. But if it is desired to have a power supply with a greater power output over that of a half bridge inverter as shown in FIG. 5a, a full bridge inverter as shown in FIG. 8 is used to produce a square wave signal having voltage swings from zero to 170 volts. The inverter circuit in FIG. 8 can be substituted for the inverter circuitry in FIG. 5a.

An alternating current source is connected to the input terminals 382 of the inverter shown in FIG. 8. The alternating current is rectified in a conventional full wave bridge rectifier 384 then stored and filtered by means of capacitors 386 and 388. A load resistor 390 is disposed in parallel with the capacitors 386 and 388. Therefore, with a standard 117 volt AC input the capacitors will develop a peak level of 170 volts on line 392 with line 394 established as the ground bus.

The inverter is comprised primarily of four transistors 396, 398, 400, and 402 which are turned on and off in diagonally opposed pairs to generate a high frequency square wave signal. Each of the transistors is shunted by a bypass diode 404, 406, 408, and 410, respectively. These diodes route any reverse voltage transients around the transistor as a protection feature. Transistors 396, 398, 400, and 402 each connects to a base drive resistor 412, 414, 416, and 418 respectively.

A transformer primary winding 420 is magnetically coupled to a secondary winding 420a which drives the base of transistor 396, a secondary 420b which drives the base of transistor 398, a secondary 420c which drives the base of transistor 400, and a secondary 420d which drives the base of transistor 402. The primary winding of a power transformer 422 is connected between a first gate terminal of the modulator 26 and the junction of the emitter of transistor 396 and collector of transistor 400. The second terminal of the gate circuit of the modulator 26 is connected to the junction of the emitter of transistor 398 and collector of transistor 402. A toroid 424 encircles a lead of the primary winding of the transformer 422 and has disposed thereon a coil which is connected between the transistors 396 and 400 and through a resistor 426 to the junction of resistors 428 and 430. Disposed in series between the collector of transistor 400 and the collector of transistor 402 are the resistors 428 and 430 and the primary winding 420. Joined between the junction of secondary windings 420c and 420d and ground is a protection diode 432 in parallel with a resistor 434.

A routing diode 436 is connected between the emitter of transistor 396 and a resistor 438 which is connected to line 392. A resistor 400 is connected from the emitter of transistor 396 to a second terminal of the secondary winding 420a and the junction of diode 436 with resistor 438. A second routing diode 442 is connected between the emitter of transistor 398 and a resistor 444 which is connected to line 392. Diode 442 is in parallel with a resistor 446 which is connected between the emitter of transistor 398 and a second terminal of secondary winding 420b.

When power is first applied to the inverter of FIG. 8, all of the transistors are turned off. Line 392 is charged to a value of 170 volts by the action of the rectifying diodes and capacitors. The voltage on line 392 leaks through both the transistors 396 and 398 as well as the series combination of resistors 438 and 440 and the series resistors 444 and 446. This causes the collector terminals of both transistors 400 and 402 to be raised to an elevated voltage with respect to line 394. Because the transistors have different leakage characteristics, there will be a voltage difference across primary winding 420. The resulting current through primary winding 420 will induce voltages in secondary windings 420a, 420b, 420c and 420d. Depending on the polarity of the current through primary 420, either transistors 396 and 402 will be forward biased and transistors 398 and 400 will be reverse biased or transistors 396 and 402 will be reverse biased and transistors 398 and 400 will be forward biased.

When primary winding 420 reaches saturation, the field collapses and applies reverse voltages to each of the secondary windings. This reverses the bias on each of the transistors and results in a situation wherein the transistor operating states are reversed. As the primary winding 420 is saturated in the reverse direction the process is repeated to generate a high frequency square wave signal that is applied to the modulator 26 which functions as previously described in the embodiments of FIGS. 5a, 5b and 7. Likewise power transformer primary winding 422 transfers power to secondary windings (not shown) as previously described for embodiments also in FIGS. 5a, 5b and 7.

Toroid 424 is provided to boost the switching effectiveness of the primary winding 420. A terminal lead of primary winding 422 passes through the toroid 424 to provide current feedback. Voltages are induced in a coil on a toroid and these voltages provide a current which is passed through resistors 426 and 428 to enhance the current flow in primary winding 420 which in turn provides stronger bias voltages at the secondary windings coupled to the primary winding 420. This current feedback loop enhances the switching of the inverter at high load current levels when additional drive is necessary to bias the switching transistors on and off.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

What is claimed is:

1. Apparatus for regulating the output voltage thereof as applied to a load, comprising:
    at least one ferrite toroid comprising a first stack,
    at least one ferrite toroid comprising a second stack spaced from said first stack,
    a first winding passing through the centers of said first stack and said second stack,
    a second winding passing through the center of said first stack,
    a third winding passing through the center of said second stack and connected in series with said second winding,
    output means connected to one terminal of said second winding and providing an output voltage applied to the load,
    a square wave generator providing an output connected to the second terminal of said third winding, and
    feedback means connected to the load and responsive to the voltage supplied thereto and generating a regulating voltage applied to said first winding.

2. Apparatus as recited in claim 1 wherein said feedback means includes an amplifier having a first input connected to receive the voltage supplied to the load and a second input connected to receive a reference voltage.

3. Apparatus as recited in claim 2 including means for adjusting the reference voltage to set the output voltage from said output means as applied to the load.

4. Apparatus as recited in claim 1 wherein said feedback means includes means connected to said output means and responsive to the output voltage at said output means and connected to said load and responsive to the output voltage applied thereto to generate the regulating voltage to the first winding.

5. Apparatus as recited in claim 4 including means responsive to the output of said square wave generator to provide a control voltage to the third winding.

6. Apparatus as recited in claim 1 wherein said output means includes means for comparing the output voltage with a predetermined threshold and generating an overvoltage indication signal for actuating an overvoltage indicator.

7. Apparatus as recited in claim 1 wherein said square wave generator comprises an inverter generating the square wave signal as an output.

8. Apparatus as recited in claim 1 wherein said output means comprises:
    a transformer having a primary winding and a secondary winding,
    a first diode connected to a first terminal of said secondary winding, and
    a second diode connected to a second terminal of said secondary winding to said first diode.

9. Apparatus as recited in claim 1 wherein said feedback means comprises:
    an operational amplifier having the output voltage connected to a first input terminal,
    a reference signal connected to a second input of said operational amplifier, and
    a current sink driven by the output of said operational amplifier, said current sink controlling the magnitude of current flow through said first winding.

10. Apparatus for regulating the output voltage thereof as applied to a load, comprising:
    a core having two separate magnetic paths, said core comprising a magnetic material having a square loop, low hysteresis characteristic,
    a first winding encircling the first and second magnetic paths,
    a second winding encircling the first magnetic path,
    a third winding encircling the second magnetic path and connected in series with said second winding,
    a square wave generator providing an output connected to the second terminal of said third winding, first means connected to one terminal of said second winding and providing an output voltage, a filter connected to be responsive to the output voltage and providing a filtered output applied to the load, feedback means connected to the load and responsive to the voltage applied thereto to generate a first feedback voltage, means for monitoring the output voltage at said first means for generating a second feedback voltage, and means for combining the first and second feedback voltages into a regulating voltage applied to said first winding.

11. Apparatus as set forth in claim 10 wherein said means for combining includes an amplifier having a first input receiving the first and second feedback signals and a second input connected to receive a reference voltage.

12. Apparatus as set forth in claim 11 wherein said means for combining further includes a mixer having one input connected to receive the first feedback signal, a second input connected to receive the second feedback signal, and an output connected to the first input of said amplifier.

13. Apparatus as set forth in claim 11 including means for adjusting the reference voltage to set the output voltage from said first means.

14. Apparatus as set forth in claim 13 wherein said means for combining includes an RFI filter connected to the load and to said mixer.

15. Apparatus for regulating the output voltage thereof as applied to a load, comprising:
- at least one toroid of a magnetic saturable material comprising a first stack,
- at least one toroid of a magnetic saturable material comprising a second stack spaced from said first stack,
- a first winding passing through the centers of said first stack and said second stack,
- a second winding passing through the center of said first stack,
- a third winding passing through the center of said second stack and connected in series with said second winding,
- output means connected to one terminal of said second winding and providing an output voltage applied to the load,
- an inverter generating a square wave signal connected to the second terminal of said third winding, said inverter including:
  - first and second output stages interconnected at an output terminal for the generated square wave signal,
  - a saturable transformer having a primary winding and first and second secondary windings, said secondary windings respectively driving said first and second output stages,
- means connected from the interconnection of the output stages to the primary winding of said transformer to produce a sharp transition from the positive to negative extremes of the generated square wave signal, and
- feedback means connected to the load and responsive to the voltage supplied thereto and generating a regulating voltage applied to said first winding.

16. Apparatus as set forth in claim 15 including a starting circuit connected to the primary winding of said transformer to provide a starting voltage to said converter.

17. Apparatus as set forth in claim 15 wherein said first and second output stages each comprise a transistor having one interconnected electrode as the output terminal and one other electrode connected to the respective one of the secondary windings of said transformer.

18. Apparatus as set forth in claim 17 wherein said means connected from the output stages to the primary winding includes an inductor connected to the interconnected electrodes of said transistors and to the primary winding of said transformers.

19. Apparatus for regulating the output voltage thereof as applied to a load, comprising:
- at least one toroid of a magnetic saturable material comprising a first stack,
- at least one toroid of a magnetic saturable material comprising a second stack spaced from said first stack,
- a first winding passing through the centers of said first stack and said second stack,
- a second winding passing through the center of said first stack,
- a third winding passing through the center of said second stack and connected in series with said second winding, and
- output means including a transformer having a primary winding and a secondary winding, the primary winding connected to one terminal of said second winding and the secondary winding providing an output voltage applied to the load.

* * * * *